UNITED STATES PATENT OFFICE 2,455,643

CONDENSATION PRODUCTS FROM KETONES AND ARALKYL ORGANIC COMPOUNDS AND METHOD FOR PRODUCING THE SAME

Arthur B. Bakalar, San Francisco, Calif., assignor to Shell Development Company, San Francisco, Calif., a corporation of Delaware No Drawing. Application March 25, 1944, Serial No. 528,148

5 Claims. (Cl. 260—649)

This invention relates to the production of condensation products of ketones with aralkyl hydrocarbons, which may be halogenated, and to the products thereof. More specifically, this invention is concerned with a process and products pertaining to diaralkyl dialkanes and to their halogenated derivatives.

When an aralkyl hydrocarbon, such as toluene, alpha methyl nephthalene, ethyl-, isopropyl-, butyl- or amyl benzene, is treated at relatively moderate temperatures with a ketone in the presence of an acid-acting condensation catalyst, condensation readily takes place with the elimination of a mole of water for every two moles of aralkyl hydrocarbon reacted with each mole of ketone.

The ketone tends to couple with the aralkyl hydrocarbons in para position to the alkyl side chain in the case where only one alkyl group is present on the aromatic nucleus. Where more than one alkyl group is present on the aromatic nucleus, the coupling takes place primarily on the para or ortho position to any one of the alkyl groups, depending on the relative positions occupied by these groups. Preferably not more than four alkyl groups are present on the aromatic neucleus of the aralkyl hydrocarbon.

The aralkyl hydrocarbon preferably contains an alkyl radical or radicals possessing not more than five carbon atoms, and may contain alkyl radicals of dissimilar carbon content or molecular configuration. Thus, not only may the aromatic nucleus be linked to alkyl radicals through a primary, secondary, tertiary or quaternary aliphatic carbon atom as is illustrated by xylene, isopropyl benzene, normal, secondary and tertiary butyl benzene, and normal, secondary and tertiary amyl benzene, but compounds such as cymene are within the purview of this invention.

The aralkyl hydrocarbon may initially contain one, two or more halogen atoms in the aromatic nucleus or in the side chains, or may have the same incorporated, after condensation, by treatment with a halogenating agent, such as free chlorine or bromine, in the presence or absence of a halogen-carrier. When the compound is treated with the halogen in the sunlight, or the halogen is passed into the compound under reflux, substitution in the side-chain takes place. In the presence of a carrier, such as iron or aluminum chloride, the halogen enters the ring. The number of halogen atoms which are so combined increases with molal excesses of halogenating agent and with increasing temperatures. In any case the sum of the nuclear halogen atoms and of the alkyl side chains of the aralkyl hydrocarbon reactant should not exceed five.

The preferred ketones are of an aliphatic type, as illustrated by acetone, methyl ethyl ketone, diethyl ketone, dipropyl ketone, pinacoline, methyl isobutyl ketone, cyclohexanone, and di-isobutyl ketone. One may use them in non-halogenated form and subsequently halogenate the ketone radical in the condensation product as indicated above, or may initially react them in their mono- or polyhalogenated forms; in the latter situation one starting with mono-, di-, trichlor-acetone, mono- or polychlormethyl ethyl ketone, or dibrom-diethyl ketone (symmetrical and asymmetrical), obtains the desired condensation product with halogen in the ketone radical. Thus, for example, a trichloracetone,

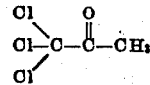

when condensed with toluene or with its chlorinated derivative,

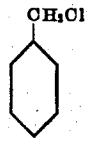

yields

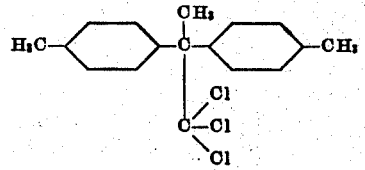

or

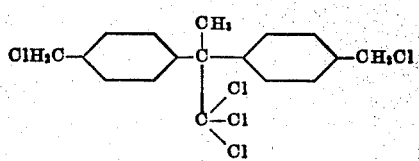

Suitable condensation catalysts are sulfuric acid, the phosphoric acids, the sulfonic acids. Their action may be augmented by supplementary agents such as alkyl acid sulfates, alkali metal- or alkyl acid phosphates, boric acid, sodium metaborate and perborate, borax and aliphatic alcohols such as methyl, isopropyl, the butyl alcohols, etc.; these agents are effective in temporizing the reaction, thereby permitting increased yields and enhanced quality of product—they apparently act as anti-sulfonating or anti-resinifying agents when present even in amounts under 5 w. per cent of the aromatic reactant.

Since sulfuric acid is readily available and inexpensive, it is preferred to the other types of catalysts. Further, it is less affected in catalytic behavior and in catalyst life by the formation of water of condensation than the solid-type or sludge-type catalysts. Sulfuric acid of 98% to about 65% strength may be used, although best results are obtained in the range of 70% to about 90% strength (titratable acidity). It is preferred to have at least 2 moles of sulfuric acid per mole of aromatic reactant; 2 to 6 moles of acid per mole of aromatic reactant being especially suitable.

The temperature of operation will vary with the catalyst and with the aromatic reactant. Best results are obtained at temperatures below 60° C. with sulfuric acid. A particularly suitable temperature range is one from about 20° C. to 40° C.

The process is best carried out in the liquid phase under atmospheric pressure or at pressures slightly above atmospheric with a molal excess of aromatic reactant to ketone reactant; it is preferable to have upwards of two moles of the former to one mole of the latter in the reaction system and to maintain such ratios in continuous operations. One way of conducting the process continuously in a cyclic operation is to maintain a circulatory stream of reaction mixture consisting predominantly of aromatic reactant, catalyst and condensation product and to introduce the ketone into the flow cycle at predetermined time periods or at different points along the line of flow, withdrawing a volume of material from the cycle to compensate for that introduced. Make-up aromatic reactant and catalyst should also be continuously supplied to the flow cycle. By this procedure, the high internal contact molal ratios of aromatic reactant to ketone of at least 5:1 and more preferably 10:1 to 30:1 or higher may be economically maintained. A modification of this flow cycle can be conducted by withdrawing a part of the reaction mixture from the reaction zone, introducing it into a separation zone, recycling at least a part of the resultant catalyst layer, with or without make-up catalyst, back into the reaction zone, recycling a part of the aromatic reactant-condensation product layer back into the reaction zone, with or without added aromatic reactant, treating the remaining portion of the latter layer to recover the condensation product therefrom, and optionally returning to the reaction zone any unreacted aromatic reactant separated from said condensation product, while introducing ketone into the reaction zone directly or indirectly through one of the recycle streams and maintaining the reactants in intimate contact, preferably by vigorous agitation.

In continuous linear flow, the aromatic reactant, with or without a minor quantity of ketone, and catalyst would be admixed with minor quantities of ketone along the line of flow, the excess aromatic reactant recovered from the effluent reaction mixture and recycled. Whether batch, semi-continuous, or continuous operation is understaken, thorough admixture and intimate contact of the reactants and catalyst should be insured, such as by vigorous stirring or turbulent flow.

As examples of this invention are the following:

Example I 2.75 moles of toluene are admixed with 70% sulfuric acid (5 moles) with thorough agitation, and one mole of acetone is gradually added while the temperature is kept at 30° C. and the agitation is maintained. After approximately six hours of reaction, during the last hour of which the temperature is permitted to rise to 40° C., the reaction mixture is allowed to stand until separation into two layers is complete. The upper layer containing the excess toluene and the condensation product is water-washed with a dilute solution of caustic soda to remove any sulfuric acid present; the product is then steam distilled to drive over the unreacted toluene. The solid condensation product possesses in apparent molecular weight of 224 and corresponds to the structure:

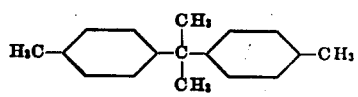

Example II

When trichloracetone,

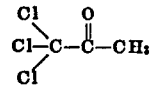

is substituted for acetone under the conditions of Example I, the condensation product is

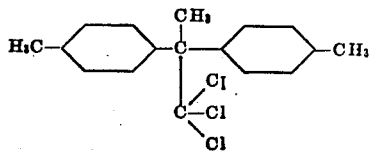

Example III

When benzyl chloride is substituted for toluene under the conditions of Example I, the condensation product is

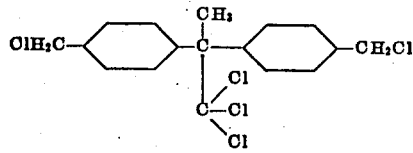

Example IV 3.2 mols of ethyl benzene are admixed with 7 mols of 90% $H_2SO_4$ and 2 mols of methyl alcohol with vigorous stirring at 25° C. 1.2 mols of monochlor methyl ethyl ketone are slowly introduced over a period of seven hours. The mixture is then treated as in Example I, the methyl alcohol being essentially retained in the lower sulfuric acid layer. The condensation product is

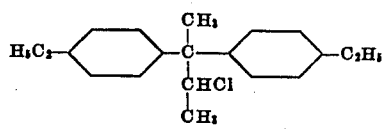

Example V

When cumene is substituted for ethyl benzene and methyl isobutyl ketone for chlor methyl ethyl ketone under the conditions of Example I, the condensation product is

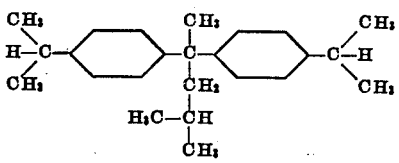

Example VI 2.68 mols of ortho chlor toluene are admixed with 1.1 mols of symmetrical dichlor diethyl ketone and 6 mols of $H_3PO_4$ (83% solution) with thorough agitation while the temperature is kept at 40–45° C. for eight hours. The mixture is then stratified and treated in accordance with Example I. The condensation product is mainly a mixture of

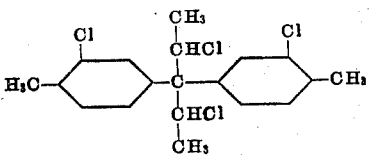

and of

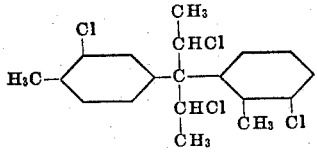

with a minor quantity of

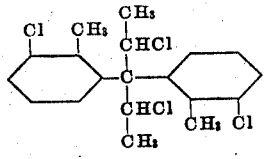

Instead of obtaining two layer separation and then steam distilling the upper layer of the reaction mixture, the reaction mixture may be filtered and the solid product water-washed. By subsequent steam distillation a molten product is obtained which is cooled with vigorous stirring. One may employ mixtures of dissimilar aralkyl hydrocarbons (which may be further halogenated) in lieu of individual reactants. The use of dissimilar aralkyl hydrocarbons, whether chlorinated or not, leads to condensation products which are asymmetrical with respect to the aralkyl nuclei. The optical isomers are also within the purview of this invention.

The products obtainable by this process are of value as dyestuff intermediates and as insecticides.

In the latter application they are utilized alone or in conjunction with various other materials, including liquid or solid carriers. Thus, they may be deposited on or combined with powdered solids such as cryolite, calcium fluoride, talc, bentonite, charcoal, sulfur, wood flour, rotenone, etc. Or they may be dissolved or dispersed in various liquids such as water, hydrocarbon insect spray oils, alcohols, ketones, chlorinated liquids (as carbon tetrachloride, difluor-dichlormethane, monochlormethane, dichlorpropylene, etc.). The solutions may be employed in emulsified state as, for example, by water addition to organic solutions of the insecticides.

To liquid mixtures thus obtained, other insecticides or fungicides may be added, as pyrethrum, di-isophorone, N-dialkyl undecyleneamides, organic thiocyanates, thiocyano-acetates, -proprionates, -lactates, etc., lead arsenate, inorganic copper or organic copper compounds, etc. Some of the resulting mixtures may be used as soil fumigants.

If employed in the form of emulsions, suitable emulsifiers may be added such as sulfate ester salts, organic sulfonates, various soaps, partial esters or ethers of polyhydric alcohols, etc. Various depositing agents may be introduced if the mixtures are destined for plant sprays.

Because of the low vapor pressures, the compounds of this invention have a long lasting toxic effect, and due to the halogen-aromatic molecular configuration they are highly desirable as toxic agents against a large variety of insects and fungi.

I claim as my invention:

1. A compound possessing the formula:

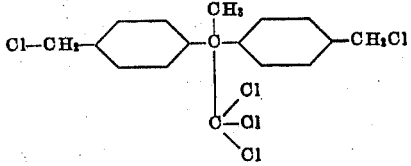

2. The process of condensing chlorinated toluene with a chlorinated aliphatic ketone, in the presence of sulfuric acid.

3. The process of condensing chlorinated toluene with chlorinated acetone in the presence of sulfuric acid.

4. The process which comprises condensing an aralkyl organic compound of the group consisting of the aralkyl hydrocarbons and the halogenated aralkyl hydrocarbons containing at least one hydrogen atom linked to a nuclear carbon atom with a ketone of the group consisting of the aliphatic ketones and the halogenated aliphatic ketones in the presence of a condensation catalyst selected from the group consisting of sulfuric acid, phosphoric acids and sulfonic acids.

5. The compounds of the general formula

wherein $R_1$ is a radical of the group consisting of the aralkyl hydrocarbon radicals and the halogenated aralkyl hydrocarbon radicals, and $R_2$ and $R_3$ are radicals of the group consisting of the alkyl hydrocarbon radicals and the halogenated alkyl hydrocarbon radicals.

ARTHUR B. BAKALAR.

REFERENCES CITED

The following references are of record in the file of this patent:

UNITED STATES PATENTS

| Number | Name | Date |
|---|---|---|
| 1,593,080 | Jordan | July 20, 1926 |
| 1,961,397 | Schoeller | June 5, 1934 |
| 1,970,972 | Orthner et al. | Aug. 21, 1934 |
| 2,143,509 | Conover et al. | Jan. 10, 1939 |
| 2,211,070 | Moss | Aug. 13, 1940 |
| 2,254,904 | Moss | Sept. 2, 1941 |
| 2,329,074 | Mueller | Sept. 7, 1943 |
| 2,384,866 | Wiczer | Sept. 18, 1945 |
| 2,391,104 | Reid | Dec. 18, 1945 |

OTHER REFERENCES

Bender, "Phenol Resins and Resinoids," page 2, (1925).

Ellis, "Chemistry of Synthetic Resins," Vol. I, page 363.

Karrer, "Organic Chemistry," page 356.

Thomas, "Anhydrous Aluminum Chloride in Organic Chemistry," pages 139–141.